(12) United States Patent
Yang et al.

(10) Patent No.: US 12,403,340 B1
(45) Date of Patent: Sep. 2, 2025

(54) FIRE ALARMING AND SUPPRESSION SYSTEM FOR ELECTRIC VEHICLE CHARGING STATION

(71) Applicant: Shanghai Tyrehub Automotive Technology Co., Ltd., Shanghai (CN)

(72) Inventors: Ke Yang, Shanghai (CN); Haifeng Li, Wuhu (CN)

(73) Assignee: Shanghai Tyrehub Automotive Technology Co., Ltd., Shanghai (CN)

( * ) Notice: Subject to any disclaimer, the term of this patent is extended or adjusted under 35 U.S.C. 154(b) by 14 days.

(21) Appl. No.: 18/660,992

(22) Filed: May 10, 2024

(30) Foreign Application Priority Data

Apr. 10, 2024 (CN) .......................... 202410434198.8

(51) Int. Cl.
*A62C 3/07* (2006.01)
*A62C 3/16* (2006.01)
*B60L 53/30* (2019.01)
*A62C 3/06* (2006.01)
*G08B 17/10* (2006.01)

(52) U.S. Cl.
CPC .................. *A62C 3/07* (2013.01); *A62C 3/16* (2013.01); *B60L 53/305* (2019.02); *A62C 3/06* (2013.01); *G08B 17/10* (2013.01)

(58) Field of Classification Search
CPC ... B60L 53/18; B60L 53/31; H02J 7/00; H02J 7/0042; A62C 3/00; A62C 3/0257; A62C 3/06; A62C 3/07; A62C 3/16
See application file for complete search history.

(56) References Cited

U.S. PATENT DOCUMENTS

| | | | |
|---|---|---|---|
| 2024/0001791 A1* | 1/2024 | Mowery | B60L 53/31 |
| 2024/0253485 A1* | 8/2024 | Cho | B60L 53/67 |
| 2024/0416162 A1* | 12/2024 | Lucarelli, III | A62C 3/16 |

FOREIGN PATENT DOCUMENTS

| | | | |
|---|---|---|---|
| KR | 2652696 B1 * | 3/2023 | |
| KR | 2654066 B1 * | 10/2023 | |

* cited by examiner

*Primary Examiner* — Van T Trieu
(74) *Attorney, Agent, or Firm* — Calfee, Halter & Griswold LLP

(57) ABSTRACT

A fire alarming and suppression system for an electric vehicle charging station includes a supporting assembly, an image information acquisition unit, a local controller and a box, wherein the supporting assembly is vertically arranged in the charging station; the image information acquisition unit is arranged at a top end of the supporting assembly for acquiring image information of electric vehicles in the charging station; the local controller is arranged on the supporting assembly for receiving the image information, analyzing and processing the image information, determining whether there is a fire risk, and providing a fire alarm if it determines that there is a fire risk; a fire blanket is provided in the box so that the fire blanket can be taken out of the box and used to cover an electric vehicle when the electric vehicle is on fire.

17 Claims, 7 Drawing Sheets

FIRE ALARMING AND SUPPRESSION SYSTEM FOR ELECTRIC VEHICLE CHARGING STATION

CROSS-REFERENCE TO RELATED APPLICATIONS

The present application claims the priority of Chinese Patent Application No. 202410434198.8 filed on Apr. 10, 2024 and titled as "Fire Alarming and Suppression System for Electric Vehicle Charging Station", which is specifically incorporated herein in entirety by reference.

FIELD

The present disclosure relates to the technical field of fire safety, in particular to a fire alarming and suppression system for an electric vehicle charging station.

BACKGROUND

Li-ion batteries are widely applied in the field of electric vehicles by virtue of their advantages such as high energy density, long cycle life, wide working temperature range and no memory effect. However, owing to their intrinsic characteristics and service environments, Li-ion batteries are prone to thermal runaway, which will cause thermal damages to Li-ion batteries and may lead to spontaneous combustion and even explosion of the electric vehicles. At present, the inducing factors of thermal runaway of Li-ion batteries may be categorized into three categories: mechanical abuses (needling, deformation caused by squeezing, and external impact), electrical abuses (overcharge, over-discharge, and short circuit), and thermal abuses (failure of thermal management system). In electrical abuses, the pressure inside a battery will be too high if the battery is charged with excessive charging current or at an excessive voltage for a long time, and the temperature inside the battery will rise when the pressure reaches a certain level, eventually leading to thermal runaway. Therefore, it is of great practical significance to provide fire alarming for electric vehicle charging stations to prevent fires caused by electrical abuses.

In related arts, since electric vehicle charging stations are usually located outdoor, the inventor of the present application has found that it is inconvenient to provide fire alarming in such large spaces, for example, it is necessary to consider how to arrange the fire alarming system in electric vehicle charging stations, how to conveniently install the fire alarming system and effectively obtain image information for fire alarming, how to integrate relevant components of the fire alarming system, and how to facilitate ongoing maintenance and service, etc. In addition, since electric vehicles are often parked together when they are charged, chained burning may occur and cause serious economic losses if one of the electric vehicles is on fire and burns. Therefore, it is of great practical significance to implement fire alarming and suppression for electric vehicle charging stations.

SUMMARY

The object of the present disclosure is to solve at least one of the technical problems in related arts to some extent. To that end, the present disclosure provides a fire alarming and suppression system for an electric vehicle charging station.

To attain the above object, the present disclosure provides a fire alarming and suppression system for an electric vehicle charging station, which includes: a supporting assembly vertically arranged in the charging station; an image information acquisition unit arranged at a top end of the supporting assembly for acquiring image information of electric vehicles in the charging station; a local controller arranged on the supporting assembly for receiving the image information, analyzing and processing the image information, determining whether there is a fire risk, and providing a fire alarm if it determines that there is a fire risk; and Optionally, the fire alarming and suppression system for electric vehicle charging station further includes an one-button alarm device arranged on the supporting assembly, wherein the one-button alarm device includes a 4G communication module in communication with an alarm platform via a network connection through a 4G mobile communication network, a button arranged to immediately send an alarm signal to the alarm platform when pressed, a microphone for voice calls with the staff of the alarm platform, and a power supply module electrically connected to the 4G communication module and the microphone respectively for power supply.

Optionally, the fire alarming and suppression system for electric vehicle charging station further includes an audible and visual alarm device, wherein a control input end of the audible and visual alarm device is connected to a control output end of the local controller, so as to control the audible and visual alarm device to send audible and visual signals when the local controller confirms that there is a fire risk through analysis.

Optionally, the audible and visual alarm device includes a loudspeaker and a light strip that extends in a height direction of the supporting assembly.

Optionally, the fire alarming and suppression system for electric vehicle charging station further includes: a signal transmission module arranged in the local controller for receiving the image information acquired by the image information collection unit and transmitting the image information; and a back-end control center communicatively connected with the signal transmission module for receiving the image information from the signal transmission module, processing and analyzing the image information, determining whether there is a fire risk at the back end, and providing a fire alarm in real time if it determines that there is a fire risk.

According to the above technical scheme, the image information acquisition unit for acquiring image information of the electric vehicles in the charging station is arranged at the top end of the supporting assembly, and the supporting assembly can be conveniently arranged at any position in the electric vehicle charging station as required, thereby any position in the electric vehicle charging station can be effectively monitored, any electric vehicle on fire can be found timely, and a problem that the fire is out of control due to untimely alarming can be avoided; furthermore, if an electric vehicle on fire is found, a person near the box may take out the fire blanket stored in the box and use the fire blanket to cover the electric vehicle on fire, so as to avoid fire spreading.

REFERENCE NUMBERS

Figure 1:
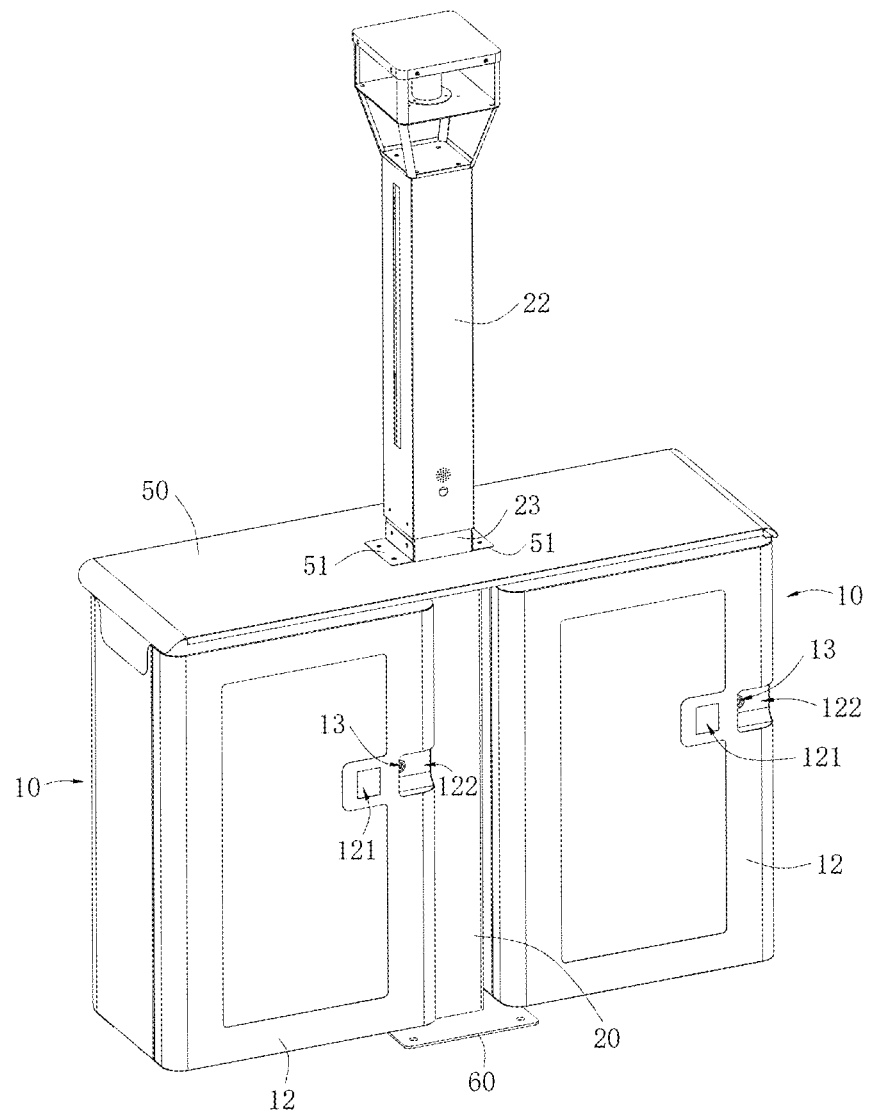
FIG. 1 is a schematic structural diagram of a fire alarming and suppression system for an electric vehicle charging station provided by the present disclosure.

10—box; 11—bottom plate; 111—raised part; 112—recessed part; 12—box door; 121—accommodating cavity; 122—notched part; 13—locking mechanism; 20—supporting assembly; 21 upright post; 22—supporting post; 221—access opening; 23—connecting pipe; 24—baffle plate; 241—clamping block; 2411—clamping slot; 242—connecting hole; 243—folded part; 25—flanged edge; 251—mounting hole; 30—bearing plate; 40—reinforcing plate; 50—connecting plate; 51—angular connecting block; 60—mounting plate; 61—connecting part.

DETAILED DESCRIPTION

Some embodiments of the present disclosure will be detailed below with reference to the accompanying drawings. It may be understood that the embodiments described herein are only provided to describe and explain the present disclosure, but are not intended to constitute any limitation on the present disclosure.

As described above and shown in FIGS. 1-5, the present disclosure provides a fire alarming and suppression system for an electric vehicle charging station, which includes a supporting assembly 20, an image information acquisition unit, a local controller and a box 10, wherein the supporting assembly 20 is vertically arranged in the charging station; the image information acquisition unit is arranged at a top end of the supporting assembly 20 for acquiring image information of electric vehicles in the charging station; the local controller is arranged on the supporting assembly 20 for receiving the image information, analyzing and processing the image information, determining whether there is a fire risk, and providing a fire alarm if it determines that there is a fire risk; the box 10 is arranged beside the supporting assembly 20 and provided with a fire blanket therein, so that the fire blanket can be taken out of the box and used to cover an electric vehicle when the electric vehicle is on fire.

It can be understood: in the present disclosure, the image information acquisition unit for acquiring image information of the electric vehicles in the charging station is arranged at the top end of the supporting assembly 20, and the supporting assembly 20 can be conveniently arranged at any position in the electric vehicle charging station as required, thereby any position in the electric vehicle charging station can be effectively monitored, any electric vehicle on fire can be found timely, and a problem that the fire is out of control due to untimely alarming can be avoided; furthermore, if an electric vehicle on fire is found, a person near the box 10 may take out the fire blanket stored in the box 10 and use the fire blanket to cover the electric vehicle on fire, so as to avoid fire spreading.

It may be noted: in the present disclosure, the image information of the electric vehicles parked in the charging station is acquired by the image information acquisition unit, and relevant image information is analyzed by the local controller to determine whether there is a fire risk and provide a fire alarm if a fire risk is detected. Compared with an existing smoke particle sensing system, the image information acquisition unit employed in the present disclosure can overcome a problem that the smoke particle sensing system is not applicable to a large space such as an outdoor charging station.

In a specific embodiment of the present disclosure, the image information acquisition unit includes a thermal imaging camera and a color camera, the thermal imaging camera is configured to acquire temperature information of the electric vehicles in the charging station and form first image data according to the temperature information; the color camera is configured to acquire real-time images of the electric vehicles in the charging station to form second image data; and the local controller can receive the first image data and the second image data, analyze and process the first image data and the second image data, determine whether there is a fire risk, and provide a fire alarm if it determines that there is a fire risk.

It can be understood: in the present disclosure, by using the image data acquired by the thermal imaging camera and the color camera in combination, the problems of missing report and false report in solely visual detection with a color camera are solved to a certain extent, thereby the fire alarming system for an electric vehicle charging station can detect fire situations more effectively and accurately.

Figure 2:
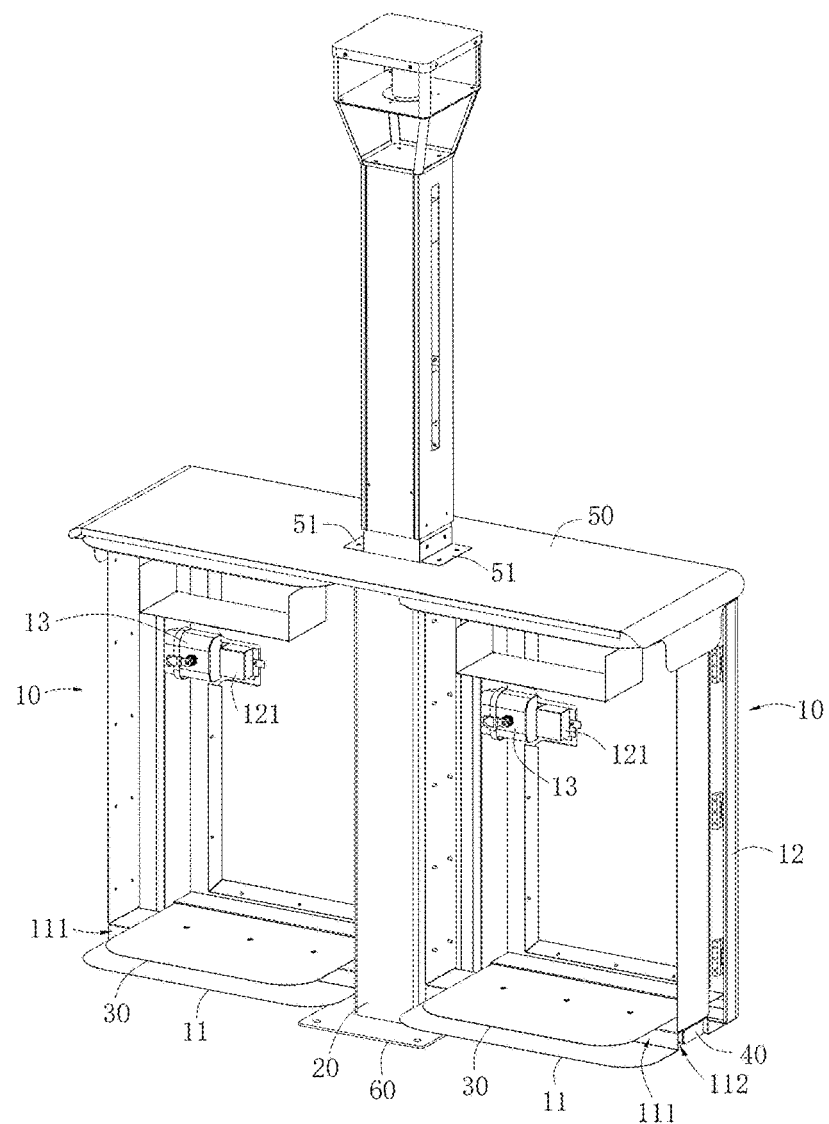
FIG. 2 is a schematic structural diagram of the fire alarming and suppression system for an electric vehicle charging station in FIG. 1 after a back panel of the box is removed.
Figure 3:
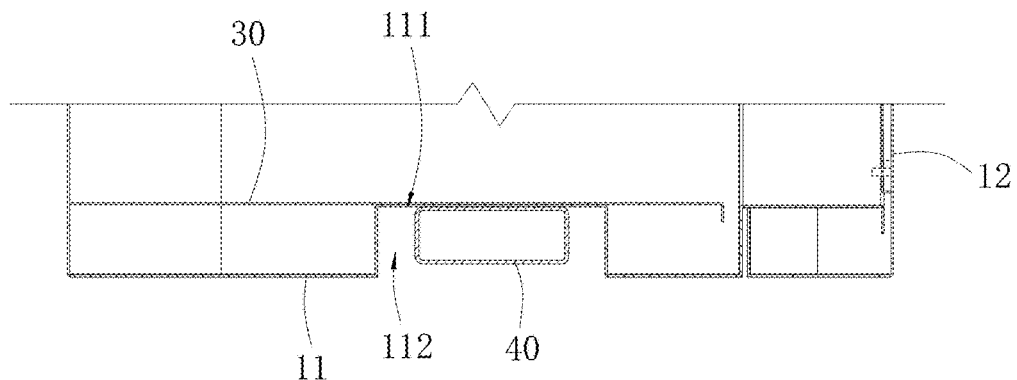
FIG. 3 is a partial sectional view of the fire alarming and suppression system for an electric vehicle charging station in FIG. 1 in the width direction of the box.
Figure 4:
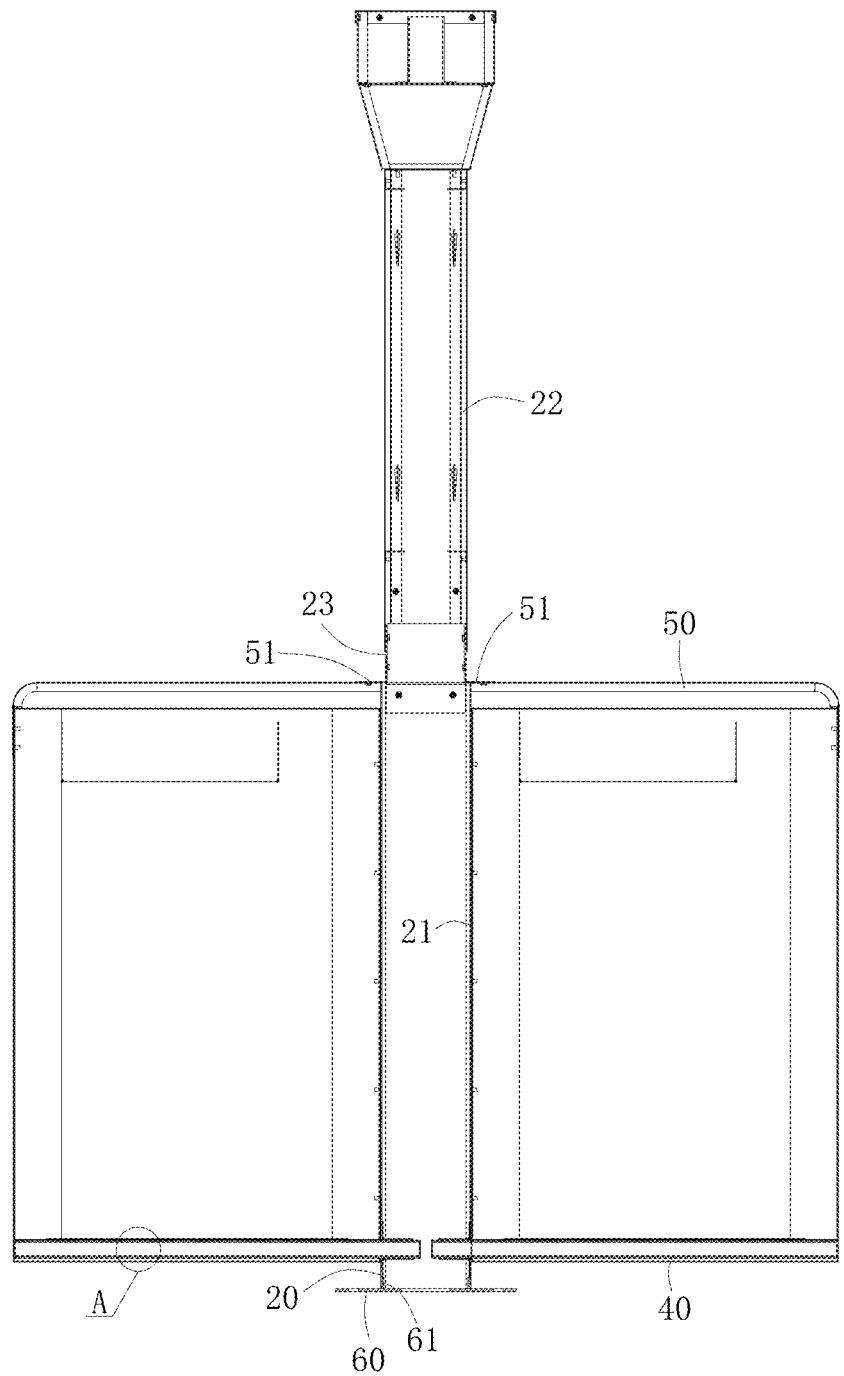
FIG. 4 is a sectional view of the fire alarming and suppression system for an electric vehicle charging station in FIG. 1 in the length direction of the box.
Figure 5:
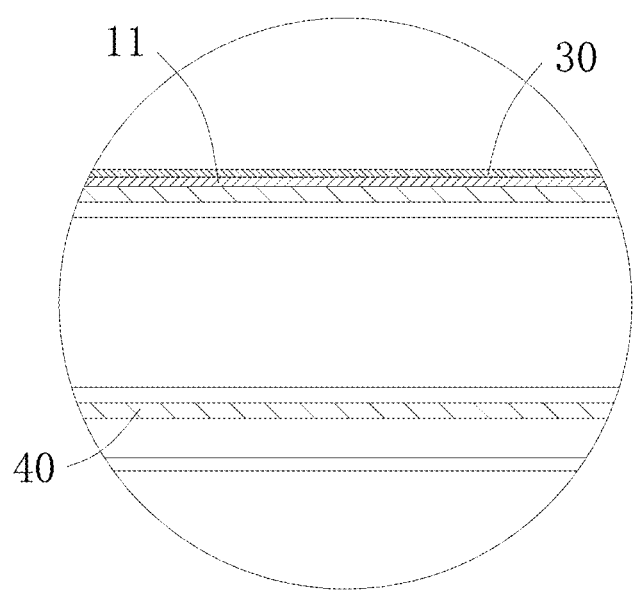
FIG. 5 is a schematic enlarged view of the part at position A in FIG. 4.

In some embodiments, as shown in FIGS. 2 and 4, a side of the box 10 is fixedly connected to the supporting assembly 20, so that the bottom of the box 10 is spaced above the ground; and a bottom plate 11 of the box 10 is bent toward the inside of the box 10 to form at least one raised part 111, and a bearing plate 30 is fixed on the raised part 111 and laid flat on the bottom of the box 10 for bearing the fire blanket.

In the present disclosure, the side of the box 10 is fixedly connected to the supporting assembly 20 to make the box 10 suspended above the ground, so as to avoid a problem that the bottom of the box 10 arranged outdoor is corroded and damaged due to long-term contact with the ground; the bottom plate 11 of the box 10 is bent toward the inside of the box 10 to form at least one raised part 111, and the bearing plate 30 is fixed on the raised part 111 to bear the fire blanket, thus, the bearing capacity of the box 10 can be significantly improved when compared with a flat bottom structure.

It can be understood that no improvement is made to the material or bottom thickness of the box 10 in the present disclosure; instead, only adjustments are made to the bottom structure. Thus, in the present disclosure, the bearing capacity of the box 10 suspended above the ground can be improved without significantly increasing the cost, so that the box 10 can meet the requirement for storing the fire blanket; besides, the bottom that the bottom of the box 10 is corroded and damaged due to long-term contact with the ground is avoided.

It may be noted: in the present disclosure, the raised part 111 may be arranged to extend in any suitable direction, as long as the top of the raised part 111 is flush to facilitate the arrangement of the bearing plate 30. For example, the raised part 111 may be arranged to extend in the width direction of the box 10.

In some embodiments, the raised part 111 extends in a length direction of the box 10, an outer side of the bottom plate 11 corresponding to the raised part 111 is formed into a recessed part 112, a reinforcing plate 40 is arranged in the recessed part 112, and an end of the reinforcing plate 40 extends out of the recessed part 112 and fixedly connected to the supporting assembly 20. By arranging the raised part 111 to extend in the length direction of the box 10, the space of the recessed part 112 formed in the outer side of the bottom plate 11 when the raised part 111 is formed on the bottom plate 11 can be utilized skillfully to arrange a reinforcing plate 40 in the recessed part 112, and the reinforcing plate 40 is connected to the supporting assembly 20, so that the box 10 can be supported by the reinforcing plate 40 to further improve the bearing capacity of the box 10.

In some embodiments, in order to further reduce the cost and reduce the dead weight, the reinforcing plate 40 is configured in a square tube shape. Especially, the square tube-shaped reinforcing plate 40 further has advantages of convenient fixation and reliable fixation.

In some embodiments, as shown in FIGS. 2 and 4, two boxes 10 are provided and respectively arranged at two sides of the supporting assembly 20. By providing two boxes 10, more fire blankets can be stored in the boxes 10, and the boxes 10 can be symmetrically arranged at two sides of the supporting assembly 20 to improve stability and prevent a problem of instability caused by arranging a box 10 only at one side of the supporting assembly 20.

In some embodiments, a connecting plate 50 is arranged above the two boxes 10, two ends of the connecting plate 50 are respectively fixedly connected to sides of the two boxes 10 that face away from each other, the connecting plate 50 is provided with a through-hole for the supporting assembly 20 to pass through, and the connecting plate 50 is connected with the supporting assembly 20 via angular connecting blocks 51. By providing an integral connecting plate 50 to connect and fix the two boxes 10 together and using angular connecting blocks 51 to connecting and fixing the connecting plate 50 and the supporting assembly 20 together, the reliability of the overall structure is improved.

In some embodiments, in the case that two boxes 10 are provided, the reinforcing plates 40 at the bottoms of the two boxes 10 extend out of respective recessed parts 112 and are respectively fixedly connected to the supporting assembly 20. By fixing one end of the reinforcing plate 40 on the supporting assembly 20 to support the box 10 with the reinforcing plate 40, the bearing capacity of the box 10 is further improved.

Figure 9:
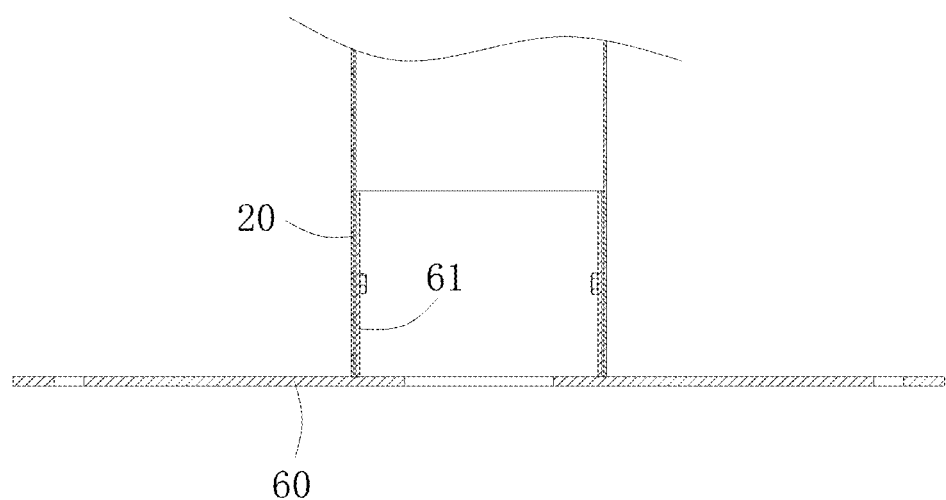
FIG. 9 is a schematic diagram of the connection between a supporting assembly and a mounting plate provided by the present disclosure.

In some embodiments, as shown in FIG. 9, a bottom end of the supporting assembly 20 is provided with a mounting plate 60, which is arranged to be close to the ground for fixing the supporting assembly 20 on the ground in a vertical direction. It may be noted that the area of the mounting plate 60 is greater than the cross-sectional area of the bottom end of the supporting assembly 20. By arranging the mounting plate 60 at the bottom end of the supporting assembly 20, the supporting assembly 20 is fixed in the vertical direction with the mounting plate 60, and the reliability of the mounting and fixation of the supporting assembly 20 on the ground is ensured.

It can be understood: in the present disclosure, the mounting plate 60 may be fixedly connected to the bottom end of the supporting assembly 20 in any suitable form; for example, the mounting plate 60 may be welded and fixed to the bottom end of the supporting assembly 20.

In some embodiments, the mounting plate 60 is provided with a connecting part 61 extending in the vertical direction for fixedly connecting to the bottom end of the supporting assembly 20.

More specifically, as shown in FIG. 9, the connecting part 61 is configured to be inserted into the bottom end of the supporting assembly 20 and fixedly connected to the supporting assembly 20 by bolts; alternatively, the connecting part 61 is provided with a cavity for the supporting assembly 20 to be inserted from top to bottom, and the connecting part 61 is fixedly connected to the supporting assembly 20 by bolts. In the above structural arrangement, the connection between the mounting plate 60 and the supporting assembly 20 is simple and efficient.

In some embodiments, a front side of the box 10 is provided with an opening, a box door 12 is rotatably connected to the box 10 for closing or opening the opening, a locking mechanism 13 is arranged between the box door 12 and the box 10 for locking or unlocking the box door 12 in a state of closing the opening; the box door 12 is provided with an accommodating cavity 121 for accommodating a key for opening the locking mechanism 13, and an opening of the accommodating cavity 121 is closed by a piece of glass.

In case of a fire, the key placed in the accommodating cavity 121 can be obtained by breaking the glass, then the locking mechanism 13 can be opened with the key, and then the door 12 can be opened, the fire blanket stored in the box 10 can be taken out and used to cover the electric vehicle on fire, so as to prevent the fire from spreading while extinguishing the fire.

In some embodiments, the box door 12 is provided with a notched part 122 extending in a thickness direction of the box door 12 for mounting the locking mechanism 13. In the structural arrangement described above, the locking mechanism 13 can be accommodated in the notched part 122 to achieve a certain protective effect, and the notched part 122 can be used as a force application point for opening the door 12, so that the door 12 can be opened without a door handle.

In the present disclosure, on one hand, the supporting assembly 20 is provided to support the image information acquisition unit, so that the image information acquisition unit can obtain a better viewing field, thereby obtain image information that is more conducive to judging whether there is a fire risk; on the other hand, the supporting assembly enables the box 10 to be suspended above the ground, thereby avoids a problem that the bottom of the box 10 is corroded and damaged due to long-term contact with the ground.

Figure 6:
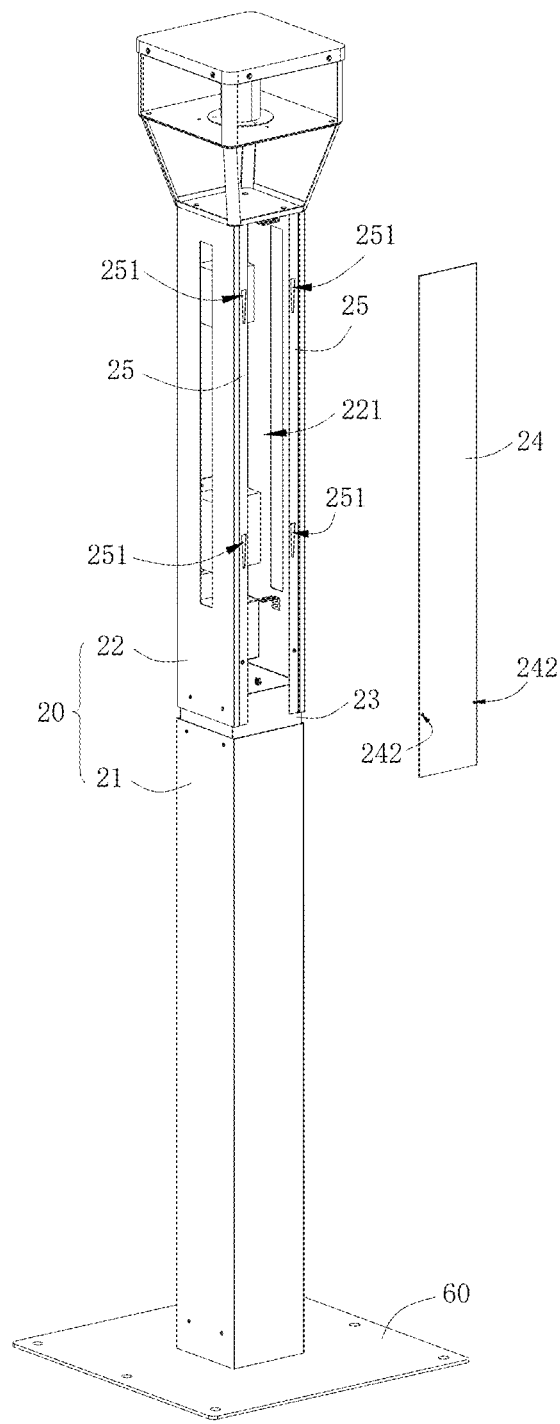
FIG. 6 is a schematic structural diagram of a supporting assembly provided by the present disclosure.

In some embodiments, as shown in FIG. 6, the supporting assembly 20 includes an upright post 21 and a supporting post 22, the upright post 21 and the supporting post 22 respectively extend in the vertical direction, and a bottom end of the supporting post 22 is detachably fixed to a top end of the upright post 21; a side of the box 10 is fixedly connected to the upright post 21, the image information acquisition unit is arranged at the top end of the supporting post 22, and the top end of the upright post 21 is not higher than a top end of the box 10.

The side of the box 10 is fixedly connected to the upright post 21, so that the bottom of the box 10 is spaced from the ground, and the image information acquisition unit is arranged at the top end of the supporting post 22, so that the image acquisition unit has a better viewing field, thereby image information that is more conducive to judging whether there is a fire risk can be obtained. In the present disclosure, the supporting assembly 20 is divided into two parts, namely, an upright post 21 and a supporting post 22, and the image information acquisition unit is arranged at the top end of the supporting post 22, so as to meet the requirement for the viewing field of the image information acquisition unit and facilitate transportation.

In the present disclosure, the upright post 21 and the supporting post 22 may be detachably connected in any suitable form. In a specific embodiment of the present disclosure, a connecting pipe 23 is arranged between the upright post 21 and the supporting post 22, and two ends of the connecting pipe 23 are respectively inserted into the upright post 21 and the supporting post 22 and fixedly connected to the upright post 21 and the supporting post 22 by bolts.

Figure 7:
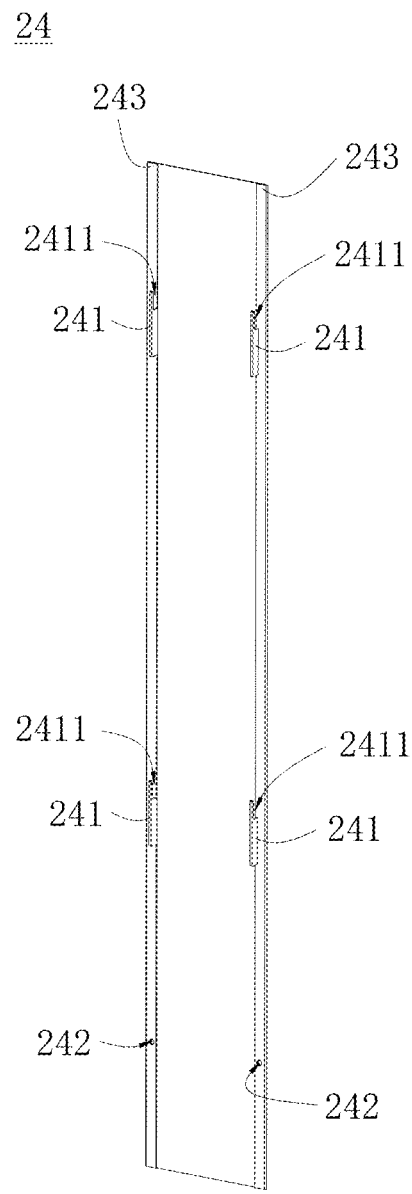
FIG. 7 is a schematic structural diagram of a baffle plate provided by the present disclosure.

In some embodiments, the upright post 21 and the supporting post 22 respectively have a hollow structure extending in the vertical direction. In particular, as shown in FIGS. 6 and 7, at least one side of the supporting post 22 is provided with an access opening 221 extending in the height direction of the supporting post 22, and the supporting post 22 is provided with a detachable baffle plate 24 for closing the access opening 221.

It can be understood: by configuring the upright post 21 and the supporting post 22 that constitute the supporting assembly 20 into hollow structures, a plurality of components and functional modules that constitute the fire alarming system can be conveniently integrated in the supporting assembly 20 while the dead weight is reduced; in addition, since at least one side of the supporting post 22 is provided with an access opening 221 extending in the height direction of the supporting post 22 and the supporting post 22 is provided with a baffle plate 24 for closing the access opening 221, maintenance and service can be carried out conveniently during later use after the baffle plate 24 is removed.

In the present disclosure, the baffle plate 24 may be arranged on the supporting post 22 in any suitable form to close the access opening 221. In some embodiments, the supporting post 22 has flanged edges 25 formed at two sides of the access opening 221 respectively, each of the flanged edges 25 has a mounting surface parallel to the baffle plate 24, the mounting surface of the flanged edge 25 is provided with a mounting hole 251 extending in the vertical direction, and the baffle plate 24 is provided with clamping blocks 241 configured to be inserted into the mounting holes 251; when the baffle plate 24 is shifted, the clamping blocks 241 are clamped and fixed in the mounting holes 251; the baffle plate 24 is further provided with connecting holes 242 for bolts to penetrate there-through and fix to the flanged edges 25.

It can be understood: in the present disclosure, by arranging flanged edges 25 with mounting surfaces at the two sides of the access opening 221 and configuring the baffle plate 24 into a flat plate, the mounting requirements can be met. In the mounting process, first, the clamping blocks 241 on the baffle plate 24 are aligned to and inserted into the mounting holes 251 in the flanged edges 25, then the baffle plate 24 is shifted so that the clamping blocks 241 are clamped and fixed in the mounting holes 251, and then the baffle plate 24 is secured and fixed to the flanged edges 25 by bolts, thus, the mounting is completed; to remove the baffle plate 24, first, the bolts between the baffle plate 24 and the flanged edges 25 are removed, and then the baffle plate 24 is shifted so that the clamping blocks 241 are aligned to the mounting holes 251 and can be moved out of the mounting holes 251. Compared with a method of directly connecting the baffle plate 24 to the flanged edges 25 by bolts, the above-mentioned connecting method provided by the present disclosure can ensure the safety in the mounting and removal process of the baffle plate 24.

In some embodiments, each of the clamping blocks 241 is provided with a clamping slot 2411 with an upward opening. When the clamping blocks 241 are inserted into the mounting holes 251 and the baffle plate 24 is shifted, the clamping slots 2411 abut and fit with the upper edges of the mounting holes 251. It can be understood: by configuring each clamping block 241 to have a clamping groove 2411 with an upward opening, the self-weight of the baffle plate 24 can be partially utilized when the baffle plate 24 is to be removed, so that the baffle plate 24 can be conveniently removed from the flanged edges 25.

In the present disclosure, in order to ensure the reliability of the connection and fixation of the baffle plate 24 to the supporting post 22, the flanged edges 25 at the two sides of the access opening 221 are provided with a plurality of mounting holes 251 respectively, and the plurality of mounting holes 251 are arranged at an interval in the vertical direction. It can be understood: in order to align the clamping blocks 241 on the baffle plate 24 to the mounting holes 251 in the flanged edges 25, the plurality of mounting holes 251 in the two flanged edges 25 at the two sides of the access opening 221 are at the same level respectively.

In some embodiments, the flanged edges 25 are bent toward the inside of the supporting post 22 to form the mounting surfaces. When the baffle plate 24 is mounted in place, the side of the supporting post 22 where the baffle plate 24 is located is an overall flat surface.

Figure 8:
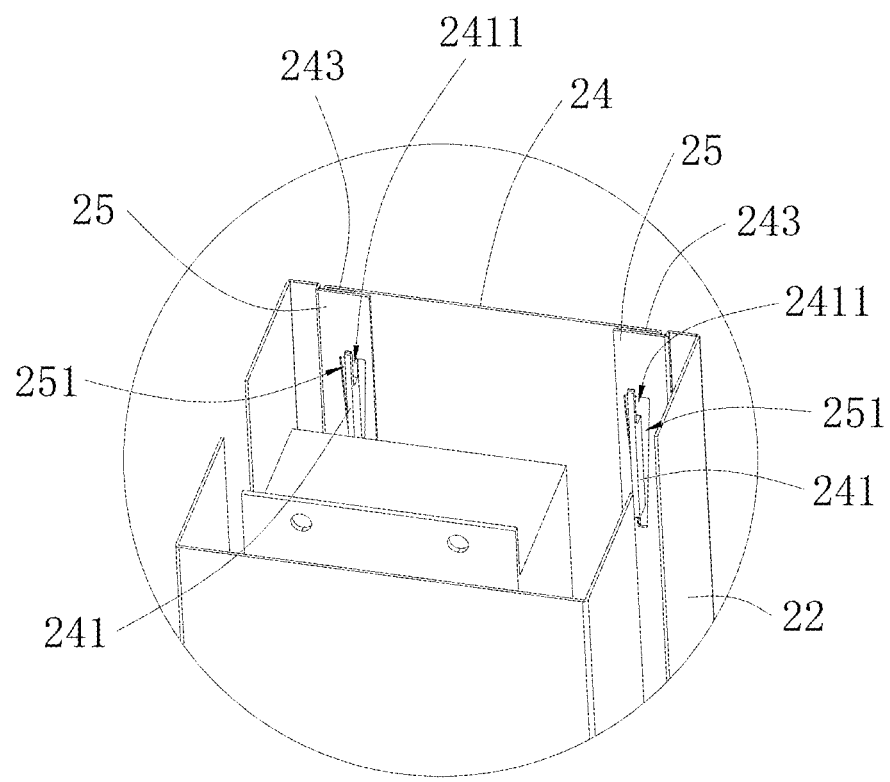
FIG. 8 is a sectional view of a supporting assembly provided by the present disclosure.

In some embodiments, in order to improve the connection strength, as shown in FIG. 8, two side portions of the baffle plate 24 are respectively bent to the side where the supporting post 22 is located to form folded parts 243, and both the clamping blocks 241 and the connecting holes 242 are arranged on the folded parts 243.

In some embodiments, the fire alarming and suppression system for electric vehicle charging station further includes an one-button alarm device arranged on the supporting assembly 20, wherein the one-button alarm device includes a 4G communication module in communication with an alarm platform via a network connection through a 4G mobile communication network, a button arranged to immediately send an alarm signal to the alarm platform when pressed, a microphone for voice calls with the staff of the alarm platform, and a power supply module electrically connected to the 4G communication module and the microphone respectively for power supply.

By providing a one-button alarm device, in case of a fire in the electric vehicle charging station, a person near the one-button alarm device can directly send an alarm signal to the alarm platform by pressing the button, and can talk with the staff of the alarm platform through the microphone at the same time to describe the situation, so as to facilitate the staff of the alarm platform to dispatch personnel to deal with the fire timely.

In the present disclosure, as a means for sending an alarm signal, the fire alarming and suppression system for electric vehicle charging station further includes an audible and visual alarm device, wherein a control input end of the audible and visual alarm device is connected to a control output end of the local controller, so as to control the audible and visual alarm device to send audible and visual signals when the local controller confirms that there is a fire risk through analysis.

More specifically, the audible and visual alarm device includes a loudspeaker and a light strip that extends in a height direction of the supporting assembly 20. By providing a light strip extending along the supporting assembly 20, specifically, in the height direction of the supporting post 22, the alarm signal is more eye-catching and easier to be noticed.

In some embodiments, the fire alarming and suppression system for an electric vehicle charging station further includes a signal transmission module and a back-end control center, wherein the signal transmission module is arranged in the local controller and used for receiving the image information acquired by the image information collection unit and transmitting the image information; the back-end control center is communicatively connected with the signal transmission module for receiving the image information from the signal transmission module, processing and analyzing the image information, determining whether there is a fire risk at the back end, and providing a fire alarm in real time if it determines that there is a fire risk. With the above scheme, remote alarming can be realized, and an alarm signal can be sent timely once the back-end control center detects a fire situation in the electric vehicle charging station, to ensure the safe operation of the electric vehicle charging station.

While some optional embodiments of the present disclosure are described above in detail with reference to the accompanying drawings, the present disclosure is not limited to those embodiments. Various simple variations may be made to the technical scheme of the present disclosure within the technical concept of the present disclosure. To avoid unnecessary repetitions, various possible combinations are not described specifically in the present disclosure. However, such simple variations and combinations shall also be deemed as having been disclosed herein and falling in the scope of protection of the present disclosure.

The invention claimed is:

1. A fire alarming and suppression system for an electric vehicle charging station, comprising:
   a supporting assembly vertically arranged in the charging station;
   an image information acquisition unit arranged at a top end of the supporting assembly for acquiring image information of electric vehicles in the charging station;
   a local controller arranged on the supporting assembly for receiving the image information, analyzing and processing the image information, determining whether there is a fire risk in the charging station, and providing a fire alarm if it determines that there is a fire risk; and
   a box arranged beside the supporting assembly and provided with a fire blanket therein, so that the fire blanket can be taken out of the box and used to cover an electric vehicle in a case that the electric vehicle is on fire.

2. The fire alarming and suppression system for an electric vehicle charging station according to claim 1, wherein a side of the box is fixedly connected to the supporting assembly, so that the bottom of the box is spaced from the ground; and
   a bottom plate of the box is bent toward the inside of the box to form at least one raised part, and a bearing plate is fixed on the raised part and laid flat on the bottom of the box for bearing the fire blanket.

3. The fire alarming and suppression system for an electric vehicle charging station according to claim 2, wherein the raised part extends in a length direction of the box, an outer side of the bottom plate corresponding to the raised part is formed into a recessed part, a reinforcing plate is arranged in the recessed part, and an end of the reinforcing plate extends out of the recessed part and fixedly connected to the supporting assembly.

4. The fire alarming and suppression system for an electric vehicle charging station according to claim 3, wherein the reinforcing plate is configured in a square tube shape.

5. The fire alarming and suppression system for an electric vehicle charging station according to claim 3, wherein two boxes are provided and respectively arranged at two sides of the supporting assembly.

6. The fire alarming and suppression system for an electric vehicle charging station according to claim 5, wherein a connecting plate is arranged above the two boxes, two ends of the connecting plate are respectively fixedly connected to sides of the two boxes that face away from each other, the connecting plate is provided with a through-hole for the supporting assembly to pass through, and the connecting plate is connected with the supporting assembly via angular connecting blocks.

7. The fire alarming and suppression system for an electric vehicle charging station according to claim 5, wherein the reinforcing plates at the bottoms of the two boxes respectively extend out of respective recessed parts and are respectively fixedly connected to the supporting assembly.

8. The fire alarming and suppression system for an electric vehicle charging station according to claim 1, wherein a bottom end of the supporting assembly is provided with a mounting plate, which is arranged to be close to the ground for fixing the supporting assembly on the ground in a vertical direction.

9. The fire alarming and suppression system for an electric vehicle charging station according to claim 8, wherein the mounting plate is provided with a connecting part extending in the vertical direction for fixedly connecting to the bottom end of the supporting assembly.

10. The fire alarming and suppression system for an electric vehicle charging station according to claim 1, wherein a front side of the box is provided with an opening, a box door is rotatably connected to the box for closing or opening the opening, a locking mechanism is arranged between the box door and the box for locking or unlocking the box door in a state of closing the opening; the box door is provided with an accommodating cavity for accommodating a key for opening the locking mechanism, and an opening of the accommodating cavity is closed by a piece of glass.

11. The fire alarming and suppression system for an electric vehicle charging station according to claim 10, wherein the box door is provided with a notched part extending in a thickness direction of the box door for mounting the locking mechanism.

12. The fire alarming and suppression system for an electric vehicle charging station according to claim 1, wherein the supporting assembly comprises an upright post and a supporting post, the upright post and the supporting post respectively extend in the vertical direction, and a bottom end of the supporting post is detachably fixed to a top end of the upright post; and
   the side of the box is fixedly connected to the upright post, the image information acquisition unit is arranged at the top end of the supporting post, and the top end of the upright post is not higher than a top end of the box.

13. The fire alarming and suppression system for an electric vehicle charging station according to claim 12, wherein a connecting pipe is arranged between the upright post and the supporting post, and two ends of the connecting pipe are respectively inserted into the upright post and the supporting post and respectively fixedly connected to the upright post and the supporting post by bolts.

14. The fire alarming and suppression system for an electric vehicle charging station according to claim 1, further comprising an one-button alarm device arranged on the supporting assembly, wherein the one-button alarm device comprises a 4G communication module in communication with an alarm platform via a network connection through a 4G mobile communication network, a button arranged to immediately send an alarm signal to the alarm platform when pressed, a microphone for voice calls with the staff of the alarm platform, and a power supply module electrically connected to the 4G communication module and the microphone respectively for power supply.

15. The fire alarming and suppression system for an electric vehicle charging station according to claim 1, further comprising an audible and visual alarm device, wherein a control input end of the audible and visual alarm device is connected to a control output end of the local controller, so as to control the audible and visual alarm device to send audible and visual signals when the local controller confirms that there is a fire risk through analysis.

16. The fire alarming and suppression system for an electric vehicle charging station according to claim 15, wherein the audible and visual alarm device comprises a loudspeaker and a light strip that extends in a height direction of the supporting assembly.

17. The fire alarming and suppression system for an electric vehicle charging station according to claim 1, further comprising:
  a signal transmission module arranged in the local controller for receiving the image information acquired by the image information collection unit and transmitting the image information; and
  a back-end control center communicatively connected with the signal transmission module for receiving the image information from the signal transmission module, processing and analyzing the image information, determining whether there is a fire risk, and providing a fire alarm in the back-end control center in real time if it determines that there is a fire risk.

* * * * *